J. PROKOP.
SIFTER.
APPLICATION FILED OCT. 1, 1912.
1,100,149.
Patented June 16, 1914.
FIG. 1.
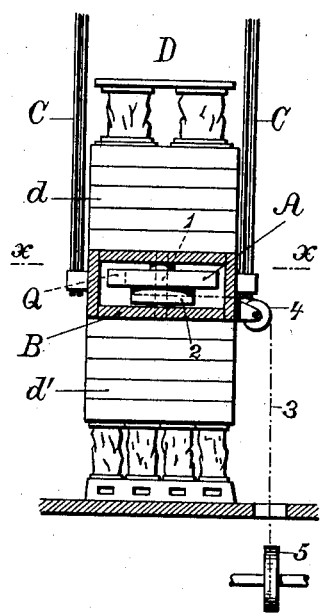
FIG. 3.
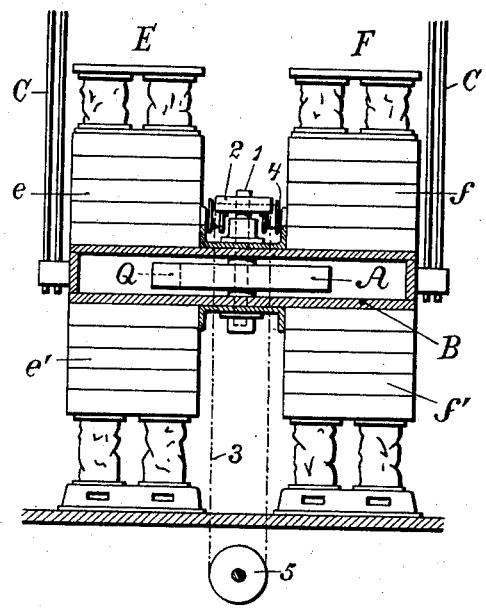
FIG. 2.
x-x
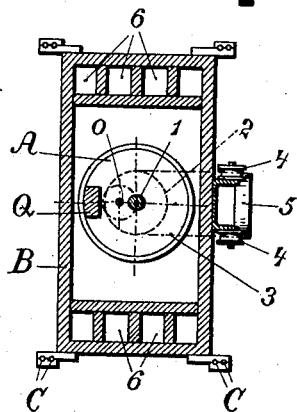
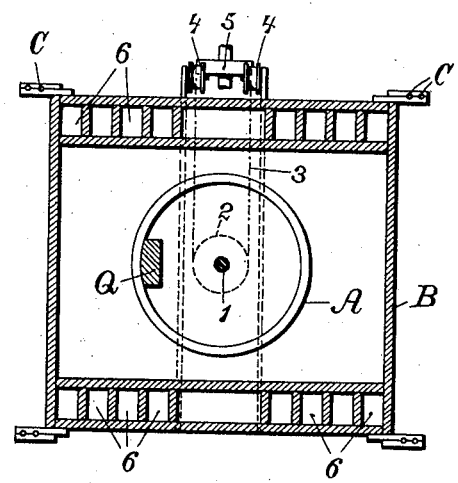
FIG. 4.
Witnesses,
Miloslav Hruby
František Matouš
Inventor,
Josef Prokop

UNITED STATES PATENT OFFICE.

JOSEF PROKOP, OF PARDUBITZ, AUSTRIA-HUNGARY.

SIFTER.

1,100,149.  Specification of Letters Patent.  Patented June 16, 1914.

Application filed October 1, 1912. Serial No. 723,315.

*To all whom it may concern:*

Be it known that I, JOSEF PROKOP, a citizen of the Empire of Austria-Hungary, residing at Pardubitz, Bohemia, Austria-Hungary, have invented certain new and useful Improvements in Sifters, of which the following is a specification.

This invention relates to a driving device for freely suspended flat sifters, the circular motion of which is brought about by the rotation of a single fly wheel with a fly wheel mass eccentrically arranged in the same. This eccentric fly wheel mass can be arranged in the fly wheel either in a fixed or in an automatically adjustable manner.

The device can be used not only for simple flat sifters with one sifting box system, but also for double flat sifters with two sifting box systems and for the smallest flat sifters with several screening frames arranged in a continuous manner on the top of each other, or with a single sifting box.

Several constructions according to this invention are illustrated, by way of example, in the accompanying drawing.

Figures 1 and 2 show the device for a single flat sifter, and Figs. 3 and 4 for a double one.

In the case of a single flat sifter, that is to say with one sifting box system, shown in Figs. 1 and 2, the fly wheel A is arranged in a frame or box B supported by the hanging rods or pendulum supports C and adjoined by the sifting box system D. One part $d$ of the sifting boxes is secured above, and the other part $d'$ below the frame B. In the frame B are provided conduits 6 used for transferring the material to be sifted, from the upper sifting boxes $d$ into the lower sifting boxes $d'$.

The fly wheel A is provided with a fly wheel mass Q eccentrically arranged in the same, and is mounted on a spindle 1 supported in the center of the frame B in its bearings in such manner that the spindle of the fly wheel is in the center of gravity of the whole sifter. When the fly wheel is rotated, a new mathematical axis of rotation $o$ is formed by the centrifugal force of the eccentrically arranged fly wheel mass (Fig. 2), about which axis $o$ the spindle 1 of the fly wheel, and the frame B secured to the said spindle, with the sifting boxes, makes a gyratory movement. The driving of the fly wheel is effected by means of a pulley 2 secured to the spindle 1, and of a belt 3 passing over two guide rollers 4 arranged on the frame B at a right angle to the counter shaft 5, in such manner that the portion of the belt between the pulley 2 and the guide rollers 4 moves with the flat sifter, and the remaining part executes a gyrating-oscillating movement.

The double flat sifter, that is to say, consisting of two sifting box systems and shown in Figs. 3 and 4, is provided with a frame or box B to which are connected the two sifting box systems E F, namely one part or half $e$ or $f$ of each system of the sifting boxes is arranged above, and the other half $e'$ or $f'$ below the frame B. In the bearings of the frame B, in its center, and therefore in the center of gravity of the whole sifter, is supported the spindle of the fly wheel A with the eccentrically arranged fly wheel mass Q, the said fly wheel being also driven by means of a belt 3. In the frame B are arranged also the conduits 6.

Owing to the arrangement of the frame B and of the fly wheel A in the same in such a manner that the fly wheel is in the center of the frame, that is to say, in the center of gravity of the whole freely suspended sifter, equilibrium between the centrifugal force of the fly wheel and the mass of the sifter is automatically produced, and shocks on the floor and the building are avoided, as the working of the sifter is uniform and smooth. Moreover, the construction of the sifter is simplified, as only one single fly wheel arranged in the center, or in the center of gravity of the sifter, effects the driving of the whole sifter.

In the double flat sifter shown in Figs. 3 and 4, the result of the arrangement of the frame B in which is mounted the fly wheel A, is also that the two sifting box systems E and F can be arranged very near to each other in the frame, so that the sifter construction becomes very compact and space is economized.

What I claim as my invention and desire to secure by Letters Patent is:—

In a freely-suspended flat sifter the combination of a box-like central frame, sifting boxes secured to the upper and lower sides of the frame, conduits in the frame for transferring the material to be sifted from the upper into the lower sifting boxes, bearings in the central frame, a fly-wheel provided with an eccentric mass and supported in said bearings, said fly-wheel being in the
5 center of gravity of the whole sifter, and means for rotating the fly-wheel.

In testimony whereof I have signed my name to this specification in the presence of two subscribing witnesses.

JOSEF PROKOP.

Witnesses:
 MILOSLAV HRUBY,
 JOHN L. BOUCHAL.

Copies of this patent may be obtained for five cents each, by addressing the "Commissioner of Patents, Washington, D. C."